(12) United States Patent
Rothkopf et al.

(10) Patent No.: US 11,314,281 B2
(45) Date of Patent: Apr. 26, 2022

(54) DISPLAY SYSTEM

(71) Applicant: Apple Inc., Cupertino, CA (US)

(72) Inventors: Fletcher R. Rothkopf, Los Altos, CA (US); James W. VanDyke, Menlo Park, CA (US); Grant H. Mulliken, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 16/437,255

(22) Filed: Jun. 11, 2019

(65) Prior Publication Data

US 2020/0081490 A1 Mar. 12, 2020

Related U.S. Application Data

(60) Provisional application No. 62/729,383, filed on Sep. 10, 2018.

(51) Int. Cl.
*H02J 7/00* (2006.01)
*G06F 1/16* (2006.01)
(Continued)

(52) U.S. Cl.
CPC ....... *G06F 1/1632* (2013.01); *G02B 27/0176* (2013.01); *G06F 1/163* (2013.01); *G06F 3/002* (2013.01); *H02J 7/00* (2013.01); *H02J 7/0042* (2013.01); *H02J 7/0044* (2013.01); *H02J 7/025* (2013.01); *H02J 50/10* (2016.02); *H02J 50/90* (2016.02); *G02B 27/017* (2013.01); *G02B 2027/0163* (2013.01); *G06F 3/011* (2013.01); *G06F 3/012* (2013.01); *H02J 50/40* (2016.02); *H02J 50/402* (2020.01)

(58) Field of Classification Search
None
See application file for complete search history.

(56) References Cited

U.S. PATENT DOCUMENTS 6,914,583 B1 * 7/2005 Chigira .............. G02B 27/0176
345/7
8,467,133 B2 6/2013 Miller
(Continued)

FOREIGN PATENT DOCUMENTS

CN 101971453 A 2/2011
CN 204103540 U 1/2015
(Continued)

OTHER PUBLICATIONS

Humavox, "Wireless Charging for Head-Mounted Displays, Promising Complete Comfort With Wireless Charging", http://www.humavox.com/smt_product/wireless-charging-head-mounted-displays/, Downloaded Aug. 23, 2018, 5 pp.

*Primary Examiner* — Arun C Williams
(74) *Attorney, Agent, or Firm* — Young Basile Hanlon & MacFarlane, P.C.

(57) ABSTRACT

A head-mounted display includes a display unit, a head support, a power storage device, and one or more receiving coils. The head support is coupled to the display unit and configured to engage a head of a user for supporting the display unit thereon. The power storage device is coupled to the display unit for storing power to be supplied to the display unit. The one or more receiving coils are coupled to the head support for inductively charging the power storage device.

20 Claims, 15 Drawing Sheets

(51) Int. Cl.
*H02J 7/02* (2016.01)
*G06F 3/00* (2006.01)
*H02J 50/90* (2016.01)
*G02B 27/01* (2006.01)
*H02J 50/10* (2016.01)
*H02J 50/40* (2016.01)
*G06F 3/01* (2006.01)

(56) References Cited

U.S. PATENT DOCUMENTS

| | | | |
|---|---|---|---|
| 2014/0143933 A1* | 5/2014 | Low | H02J 7/025 2/170 |
| 2016/0196693 A1* | 7/2016 | Kobayashi | G06F 3/014 345/633 |
| 2016/0359355 A1 | 12/2016 | Schoene et al. | |
| 2017/0307891 A1* | 10/2017 | Bucknor | G06F 3/012 |
| 2017/0315367 A1* | 11/2017 | Maruyama | G02B 27/0179 |
| 2017/0331316 A1 | 11/2017 | Bushnell et al. | |
| 2018/0067621 A1 | 3/2018 | Bailey et al. | |
| 2018/0078034 A1 | 3/2018 | Savall et al. | |
| 2018/0081171 A1 | 3/2018 | Park et al. | |
| 2018/0108322 A1 | 4/2018 | Sahin | |
| 2018/0123379 A1 | 5/2018 | Ha et al. | |
| 2018/0175658 A1 | 6/2018 | Aghassian et al. | |
| 2018/0183261 A1 | 6/2018 | Kwak et al. | |
| 2018/0204380 A1 | 7/2018 | Kumar et al. | |
| 2020/0368616 A1* | 11/2020 | Delamont | A63F 13/25 |

FOREIGN PATENT DOCUMENTS

| | | |
|---|---|---|
| CN | 207504616 U | 6/2018 |
| CN | 108292044 A | 7/2018 |
| WO | 2016143279 A1 | 9/2016 |

* cited by examiner

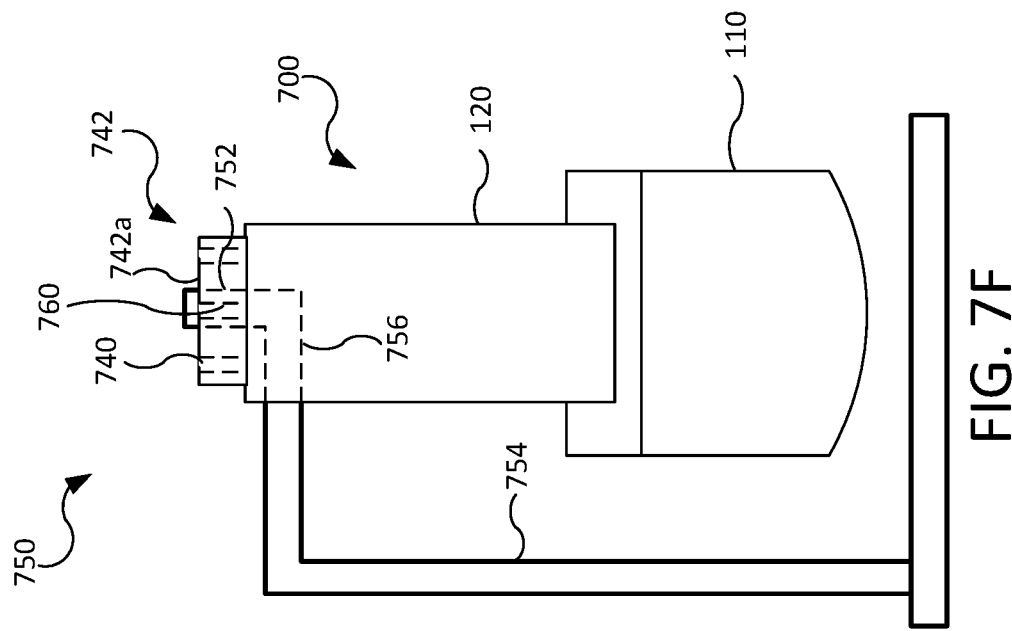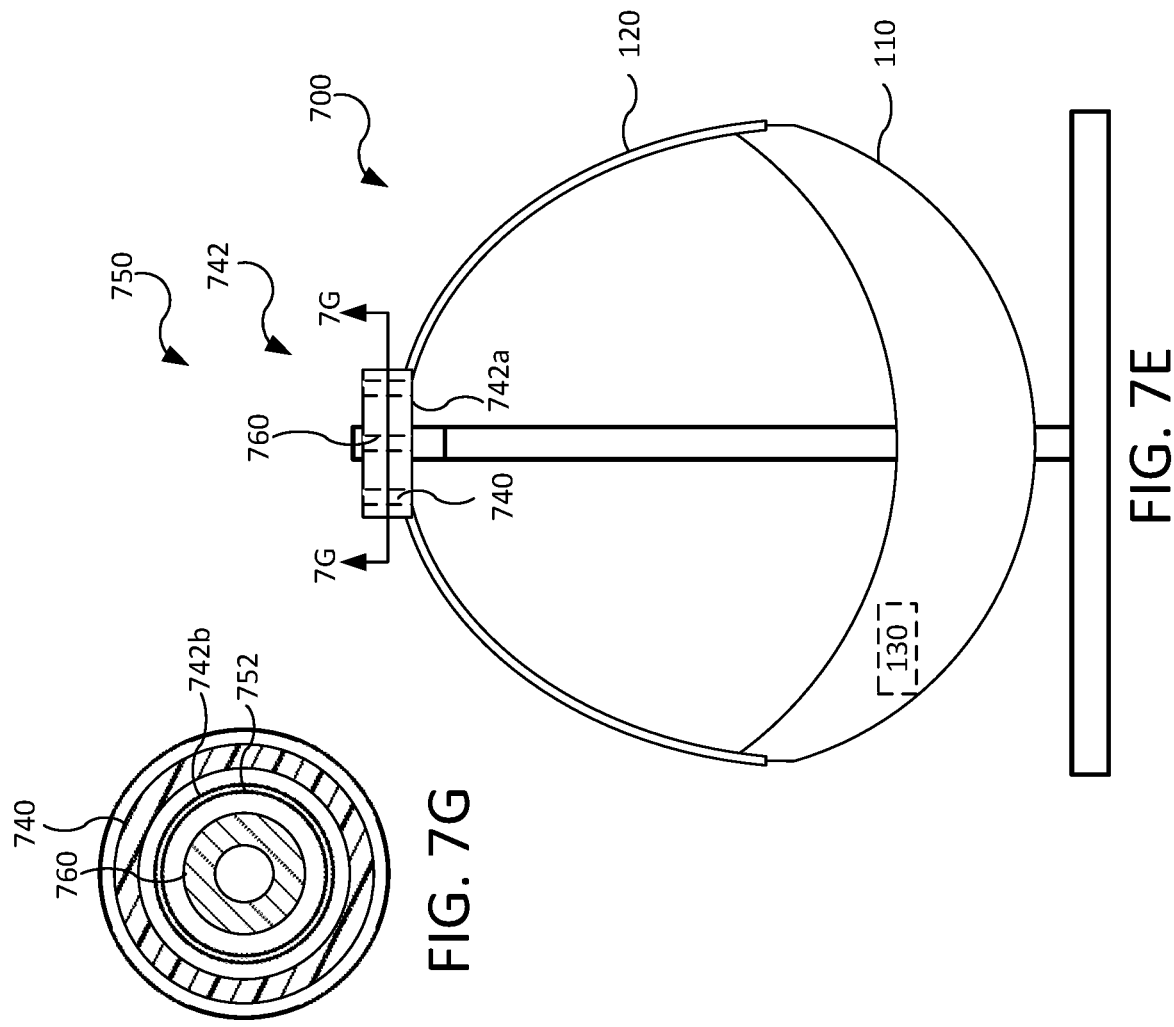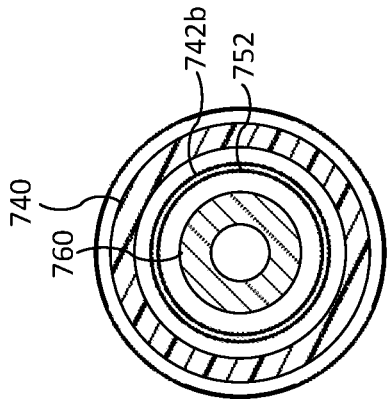

900

Transfer power inductively at first rate to charge power storage device of head-mounted display unit (e.g., when not on head of user and/or when not displaying graphics)
910

Transfer power inductively at second rate, lower than the first rate, to power display unit of the head-mounted display unit (e.g., when on head of user and/or when displaying graphics)
920

DISPLAY SYSTEM

CROSS-REFERENCE TO RELATED APPLICATION(S)

This application claims priority to and the benefit of U.S. Provisional Application No. 62/729,383, filed Sep. 10, 2018, the entire disclosure of which is incorporated by reference herein.

TECHNICAL FIELD

This disclosure relates to display systems and, in particular, head-mounted display systems and power supply devices thereof.

BACKGROUND

Wearable devices are subject to contaminants produced by the user wearing the device and of the environment. User contaminants may, for example, include body oils, sweat, and soap residue. Environmental contaminants may, for example, include water, chemicals, and dust, among others.

SUMMARY

Disclosed herein are implementations display systems, including head-mounted displays and power supply devices.

In one implementation, a head-mounted display includes a display unit, a head support, a power storage device, and one or more receiving coils. The head support is coupled to the display unit and configured to engage a head of a user for supporting the display unit thereon. The power storage device is coupled to the display unit for storing power to be supplied to the display unit. The one or more receiving coils are coupled to the head support and located rearward of the display unit for inductively charging the power storage device.

The head-mounted display may include two or more of the receiving coils spaced apart along the head support. The head support may include a receiver having a housing containing a receiving coil, the receiver defining an aperture for receiving a protrusion having a transmission coil of a power supply device.

In one implementation, a display system includes a head-mounted display and a power supply device. The head-mounted display includes a display unit, a head support, a power storage device, and a receiving coil. The head support is coupled to the display unit for engaging and extending alone one or both of a left side or a right side of a head of a user to support the display unit thereon. The power storage device is coupled to the display unit for supplying power to the display unit. The receiving coil is coupled to and co-located with the head support for inductively charging the power storage device. The power supply device includes a base, a transmission coil, and a power source. The transmission coil is coupled to the base. The power source is coupled to the transmission coil. The head-mounted display and the power supply device are cooperatively configured to align the transmission coil with the receiving coil for the transmission coil to produce an electromagnetic field that passes through the receiving coil for charging the power storage device.

In another implementation, a method is provided for supplying power to a head-mounted display with a power supply device. The method includes in a first mode, when the head-mounted display is not worn by a user, inductively supplying power at a first rate from the power supply device to the head-mounted display to charge a power storage device of the head-mounted display. The method further includes in a second mode, when the head-mounted display is worn by a user, inductively supplying the power at a second rate from the power supply device to the head-mounted display to power a display unit of the head-mounted display, the second rate being lower than the first rate.

BRIEF DESCRIPTION OF THE DRAWINGS

FIG. 7E is a front view of the head-mounted display of FIG. 7A on the power supply device of FIG. 7C with select hidden components depicted in dashed lines.

FIG. 7F is a side view of the head-mounted display of FIG. 7A on the power supply device of FIG. 7C with select hidden components depicted in dashed lines.

FIG. 7G is a cross sectional view of the head-mounted display of FIG. 7A on the power supply device of FIG. 7C taken along line 7G-7G in FIG. 7E.

DETAILED DESCRIPTION

Disclosed herein are embodiments of wearable displays and power supply devices therefor and, in particular, displays that are to be worn on a head of a user, which may be referred to as a head-mounted display (HMD). The head-mounted displays and the power supply devices corresponding thereto are configured to transmit electrical power wirelessly therebetween (e.g., inductively). The head-mounted display may thereby be powered wirelessly (e.g., inductively) and a power storage device thereof (e.g., a battery) may be wirelessly charged (e.g., inductively charged).

Conventional conductive charging requires physical access to power contacts (e.g., terminals), which are, thereby, subject to contact with the aforementioned contaminants and related degradation, and which may also provide leak paths for the contaminants to reach internal components of the device being powered. Wireless charging (e.g., inductive charging) allows power receiving components (e.g., induction coils) to be contained (e.g., sealed) in other structures, thereby being isolated from the contaminants, while also providing fewer leak paths for the contaminants to reach other electronic components subject to degradation with exposure thereto. Beyond limiting exposure to contaminants, wireless charging (e.g., inductive charging) may provide other benefits over conventional conductive charging, such as different form factors and resultant physical interaction between the wearable display and the power supply device, which may be easier for users and/or provide an otherwise improved user experience.

Figure 1A:
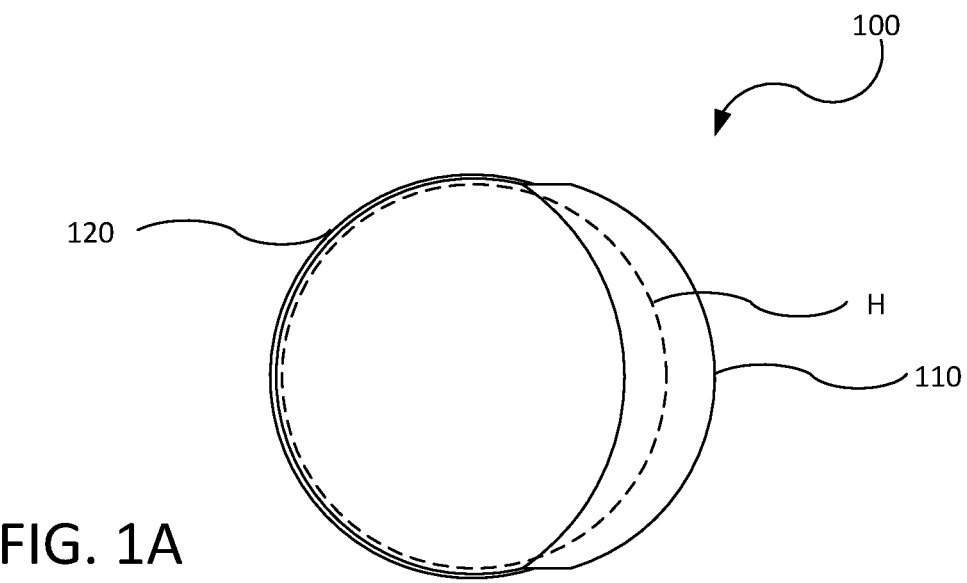
FIG. 1A is a top view of a head-mounted display on a head of a user.
Figure 1B:
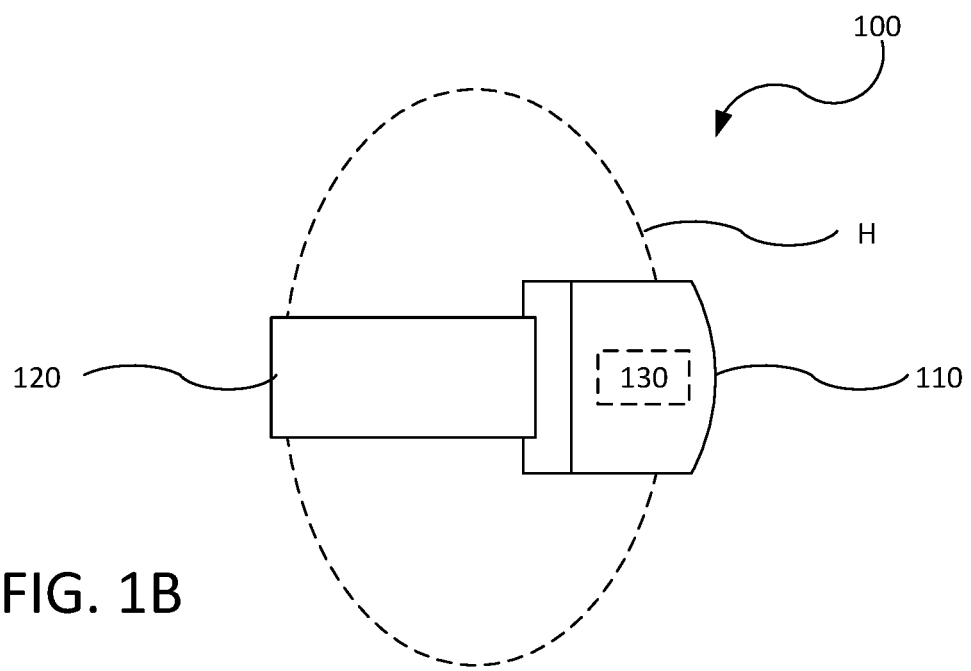
FIG. 1B is a side elevation view of the head-mounted display of FIG. 1A on the head of the user.

Referring to FIGS. 1A and 1B, a head-mounted display 100 is a device that is to be worn on a head H of a user and that displays graphic content to the user, such as with computer-generated reality (as discussed below). The head-mounted display 100 generally includes a display unit 110, a head support 120, and a power storage device 130. The display unit 110 may, for example, include a housing and one or more display screens (e.g., liquid crystal display (LCD), organic light-emitting diodes (OLED)), which are coupled to the housing (e.g., contained thereby) and display light directly to eyes of the user or project light onto a reflector (e.g., a lens) to be reflected to the user. The housing of the display unit 110 may engage a front side of the head H of the user (e.g., the nose or face of the user, such as in areas surrounding the eyes of the user).

The head support 120 is coupled to the display unit 110 and engages the head H of the user, so as to support the display unit 110 on the head H of the user. The head support 120 may, for example, be configured as a single- or multi-piece strap or band that extends rearward of the display unit 110 along left and/or right sides of the head H of the user and may further extend behind the head H of the user (as shown). In conjunction with the display unit 110, the head support 120 may wholly or partially surround (e.g., circumscribe) the head H of the user. The head support 120 may, for example, include or be made of one or more flexible and/or elastic materials. For example, the head support 120 may be formed of a rubber or other polymeric material, which seals electrical components (e.g., induction coils, discussed below) of the head-mounted display 100 therein. Such electrical components may, for example, be coupled to a flexible circuit board contained (e.g., sealed within) the rubber or other polymeric material.

The power storage device 130 is, for example, a battery that stores energy for providing electrical power to the display unit 110 and other electronics (not shown) of the head-mounted display 100, such as processors, sensors, and/or transceivers. In other implementations, the power storage device 130 may be omitted in which case the power supply devices supply power for operating, but not charging, the head-mounted display 100.

Referring to FIGS. 2A-2D, the head-mounted display 100 is configured to supply electrical power wirelessly (e.g., via induction) to the head-mounted display 100 to power the display unit 110 and other electronic components thereof (e.g., computing components) and/or to charge the power storage device 130. With wireless power transfer, and in particular inductive power transfer or inductive charging, power-transfer electronics of the head-mounted display 100 may be covered and/or sealed from exposure to contaminants from the user (e.g., body oils, sweat, soap residue) and the environment (e.g., water). In contrast, with conventional conductive charging, conductive charging contacts must be accessible to allow physical contact therewith, which may expose the charging contacts to the aforementioned contaminants, provide leak paths for the contaminants to reach electronic components, and degradation associated therewith.

The head-mounted display 100 include one or more induction coils 240 (e.g., two, three (as shown), four, five, or more), which are coupled to the head support 120 of the head-mounted display 100. To distinguish from induction coils 360 of the power supply devices (discussed below), the induction coils 240 of the head-mounted display 100 are referred to herein as receiving coils 240, while the induction coils 360 of the power supply devices are referred to herein as transmission coils 360. The induction coils of the various head-mounted displays and the power supply devices discussed below may also be referred to cooperatively as induction coils 240, 360 (or 740, 760).

The receiving coils 240, which are depicted in dashed lines, may be hidden from view and/or protected from the contaminants described above. For example, the receiving coils 240 may be covered by (e.g., hidden), contained by (e.g., sealed), or embedded in the head support 120. Instead or additionally, the receiving coils 240 may include one or more coil housings (not shown), which contain (e.g., seal) one or more of the receiving coils 240 therein for protection from the contaminants. If contained in a coil housing, the housing and, thereby, the receiving coil 240 may be coupled to an exterior surface of the head support 120.

One of more corresponding power supply devices, which will be discussed in further detail below, include the induction coils 360, referenced above, that correspond to the receiving coils 240. The head-mounted display 100 and the various power supply devices are additionally cooperatively configured to ensure proper alignment between the receiving coils 240 and the transmission coils 360, respectively, thereof. The induction coils 240, 360 are configured to be laterally aligned (e.g., being coaxial) and spaced apart (e.g., in the axial direction).

Figure 2A:
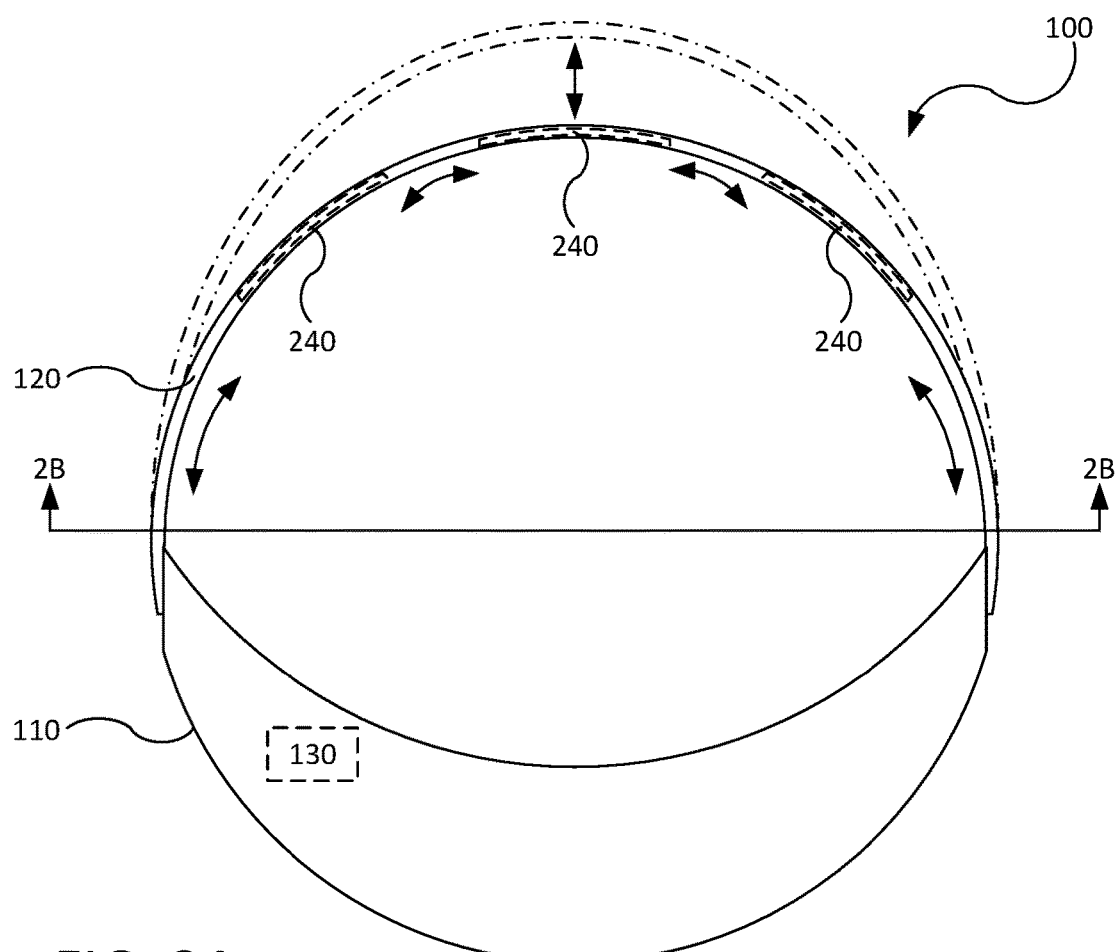
FIG. 2A is a top view of the head-mounted display of FIG. 1A in a first state (solid lines) and a second state (dash-dot lines) with select hidden components shown in dashed lines.
Figure 2B:
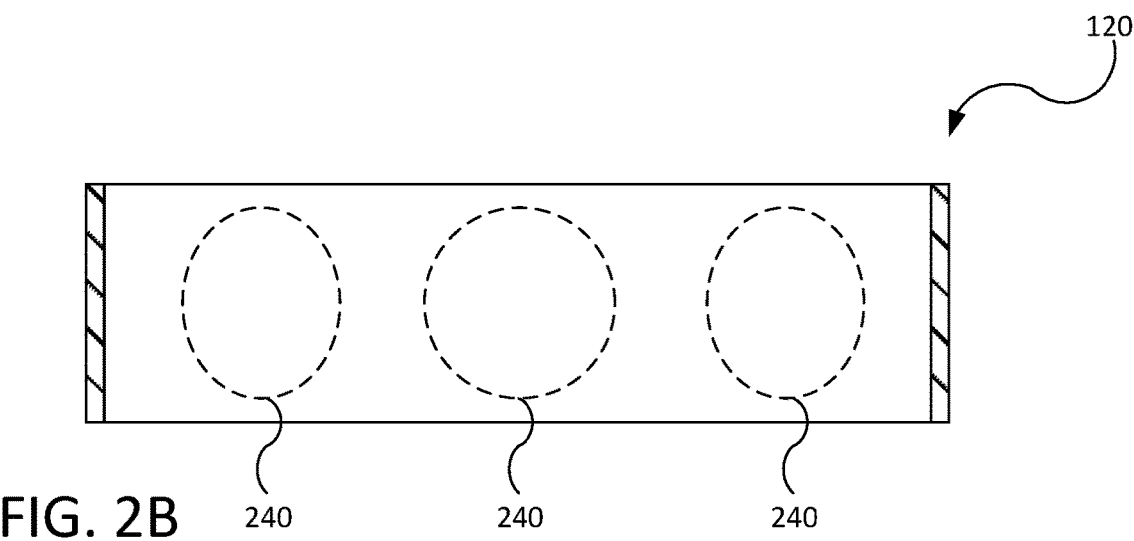
FIG. 2B is a cross-sectional view of the head-mounted display of FIG. 1A taken along line 2B-2B in FIG. 2A with select hidden components depicted in dashed lines.

Referring still to FIGS. 2A-2B, the one or more receiving coils 240 are coupled to the head support 120 at one or more locations of the head support 120 (e.g., being co-located with the head support 120 generally rearward of the display unit 110), and may be distributed (e.g., spaced apart) along a length of the head support 120. As such, the receiving coils 240 may be located along the left and/or right sides of the head H of the user and/or behind the head H of the user. As compared to using a one of the receiving coils 240 of comparable size, multiple receiving coils 240 allow the power storage device 130 to be charged at a higher rate. The receiving coils 240 are in wired connection with the display unit 110, the power storage device 130, or other suitable power electronics associated therewith.

Figure 2C:
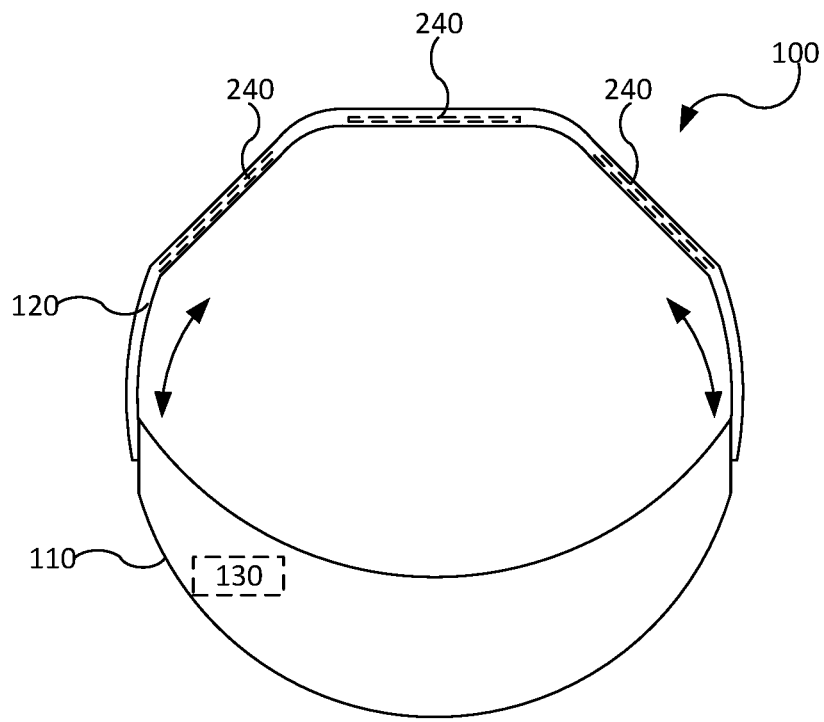
FIG. 2C is a top view of a variation of the head-mounted display of FIG. 1A with select components depicted in dashed lines.
Figure 2D:
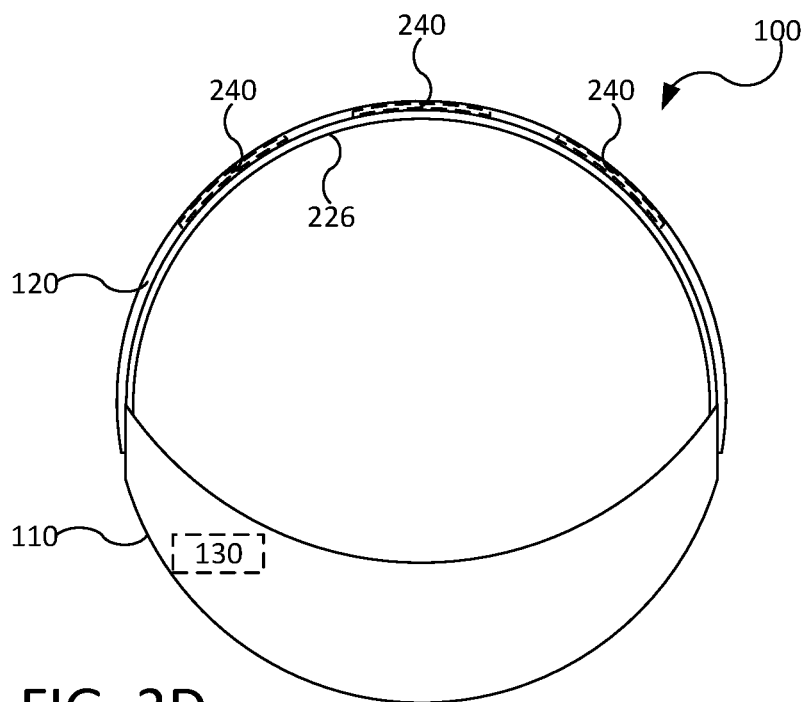
FIG. 2D is a top view of another variation of the head-mounted display of FIG. 1A.

The head support 120 is configured to accommodate different shapes and sizes of heads H of different users, for example, by being flexible and/or expandable (e.g., adjustable in length). The head support 120 may be flexible to conform with the different shapes of the heads H of the different users. As shown in FIG. 2A, the receiving coils 240 may be flexible and/or curved, such that the head support 120 conform to different curvatures of the heads H of the users. To accommodate the different curvatures of the heads H of the users, the receiving coils 240 may be curved only a small amount (e.g., 15 degrees or less) and/or require bending only a small amount. Alternatively, as shown in FIG. 2C, the receiving coils 240 may be planar and/or generally rigid, while the head support 120 (e.g., the strap or band) is flexible therebetween. Instead or additionally, as shown in FIG. 2D, the head support 120 may include a compressible material 226 on an inner side thereof (e.g., a foam), which is arranged between the receiving coils 240 and the head H of the user to accommodate the different shapes of the heads H of the different users. The compressible material 226 may be used with either the receiving coils 240 that are either flexible or rigid and/or curved or planar.

The head support 120 may also be expandable in length (e.g., adjustable in length) to accommodate the different sizes of the heads H of the different users. For example, the head support 120 may have a first length (e.g., a stored or resting length) from which the head support 120 may increase in length to accommodate the different sizes of the heads H of the different users (e.g., indicated by the arrows in FIG. 2A). At the first length of the head support 120, the receiving coils 240 are arranged in a first lateral configuration relative to each other (i.e., are in spaced-apart lateral positions left-to-right and up-to-down). With the head support 120 being flexible, the receiving coils 240 may be arranged at different angular orientations while still in the first lateral configuration (e.g., axes of the receiving coils 240 changing angles therebetween). The receiving coils 240 may, for example, not overlap each other.

In one example, the length of the head support 120 may change by being elastic, so as to stretch from the first length to a suitable length to accommodate the head H of different users and thereafter retract back to the first length. For example, the head support 120 may elastic in length in regions adjacent (e.g., between) the receiving coils 240 (e.g., indicated by the individual arrows in FIG. 2B), while regions of the head support 120 coupled to (e.g., containing) the receiving coils 240 are inelastic. When the head support 120 is expanded from the first length, the lateral configuration of the receiving coils 240 may change (e.g., increasing in lateral spacing therebetween). When the head support 120 is removed from the head H of the user, the head support 120 retracts due to the elasticity back to the first length with the receiving coils 240 in the first lateral configuration.

In another example, the head support 120 may be inelastic in regions between two or more of the receiving coils 240 (e.g., between all of the receiving coils 240), while being elastic in regions beyond the receiving coils 240 (e.g., between end ones of the receiving coils 240 and the display unit 110) (e.g., indicated by arrows in FIG. 2C). In such case, regardless of the length of the head support 120, the receiving coils 240 may be held in a constant (e.g., fixed distance or fixed positions) lateral configuration relative to each other (e.g., being coupled to a common flexible circuit board).

In a further example, the head support 120 changes in length by coupling to the display unit 110 at different locations thereof and/or by coupling multiple portions of the head support 120 (e.g., being a multi-piece band or strap) together at different locations with a mechanical fastening mechanism (e.g., buckles, clasps, magnets, hook and look fasteners, or other suitable mechanisms). In such cases the head support 120 may be elastic or inelastic and the lateral configuration of the receiving coils 240 may or may not change, respectively, depending on the length of the head support 120.

Referring to FIGS. 3A-3E, one or more power supply devices are configured to supply power and/or charge the head-mounted display 100. The power supply device and the head-mounted display 100 may be considered to cooperatively form a display system. As referenced above, the power supply device includes transmission coils 360. The transmission coils 360 generate electromagnetic fields that pass through the receiving coils 240, when aligned therewith, to be converted into electrical power. The power supply devices and the head-mounted display 100 include cooperative alignment components (e.g., mechanical features and/or magnets) that interact with each other to ensure proper alignment.

Still referring to FIGS. 3A-3E, a power supply device 350 is configured as a flexible structure that conforms to the shape of the head support 120. The power supply device 350 generally includes a body 352 that is flexible, a power cord 354, and one or more transmission coils 360, as described above.

The power cord 354 is configured to connect the power supply device 350 to a power source to provide electrical power to the transmission coils 360.

The transmission coils 360 are coupled to the body 352, which is in turn coupleable to the head support 120 of the head-mounted display 100. The transmission coils 360 correspond to the receiving coils 240 of the head-mounted display 100. The transmission coils 360 may be provided in equal number as the receiving coils 240 (e.g., three as shown). The transmission coils 360 are coupled to the body 352 at positions corresponding to the positions of the receiving coils 240 on the head support 120, for example, mirroring the first lateral configuration of the receiving coils 240. As a result, when the body 352 of the power supply device 350 is coupled to the head support 120 of the head-mounted display 100, the transmission coils 360 are laterally aligned with the receiving coils 240 corresponding thereto, as indicated by axes thereof shown in dash-dot lines.

Figure 3A:
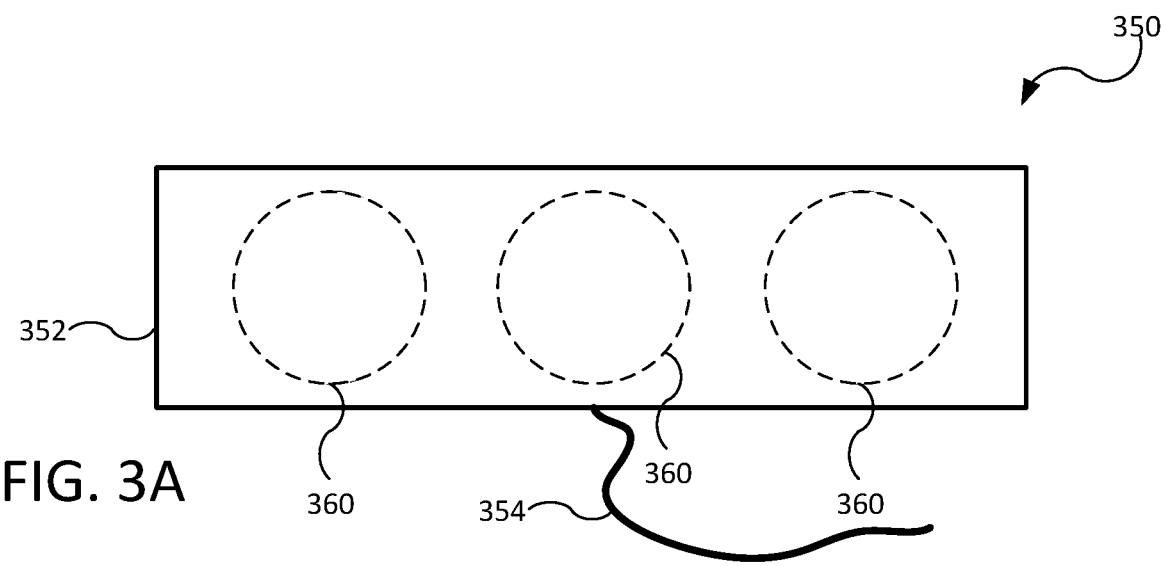
FIG. 3A is a front view of a power supply device for the head-mounted display of FIG. 1A with select hidden components shown in dashed lines.
Figure 3B:
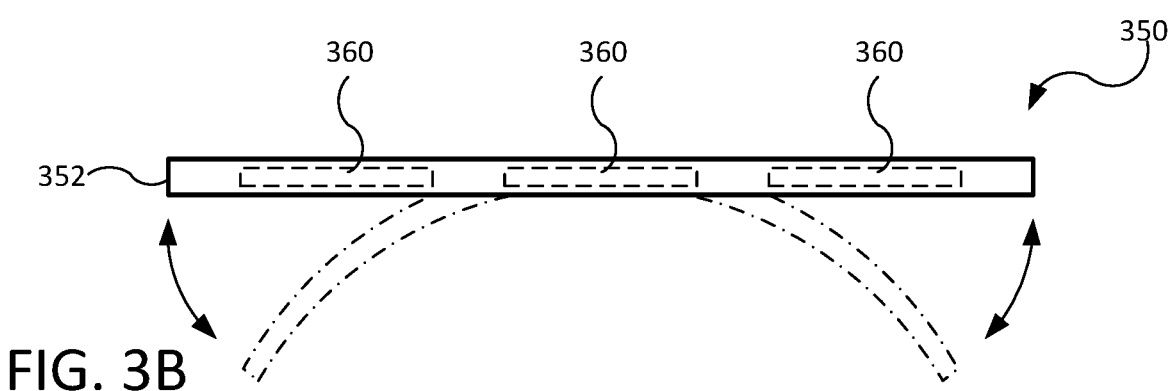
FIG. 3B is a top view of the power supply device of FIG. 3A shown in a first state (solid lines) and a second state (dash-dot lines).
Figure 3C:
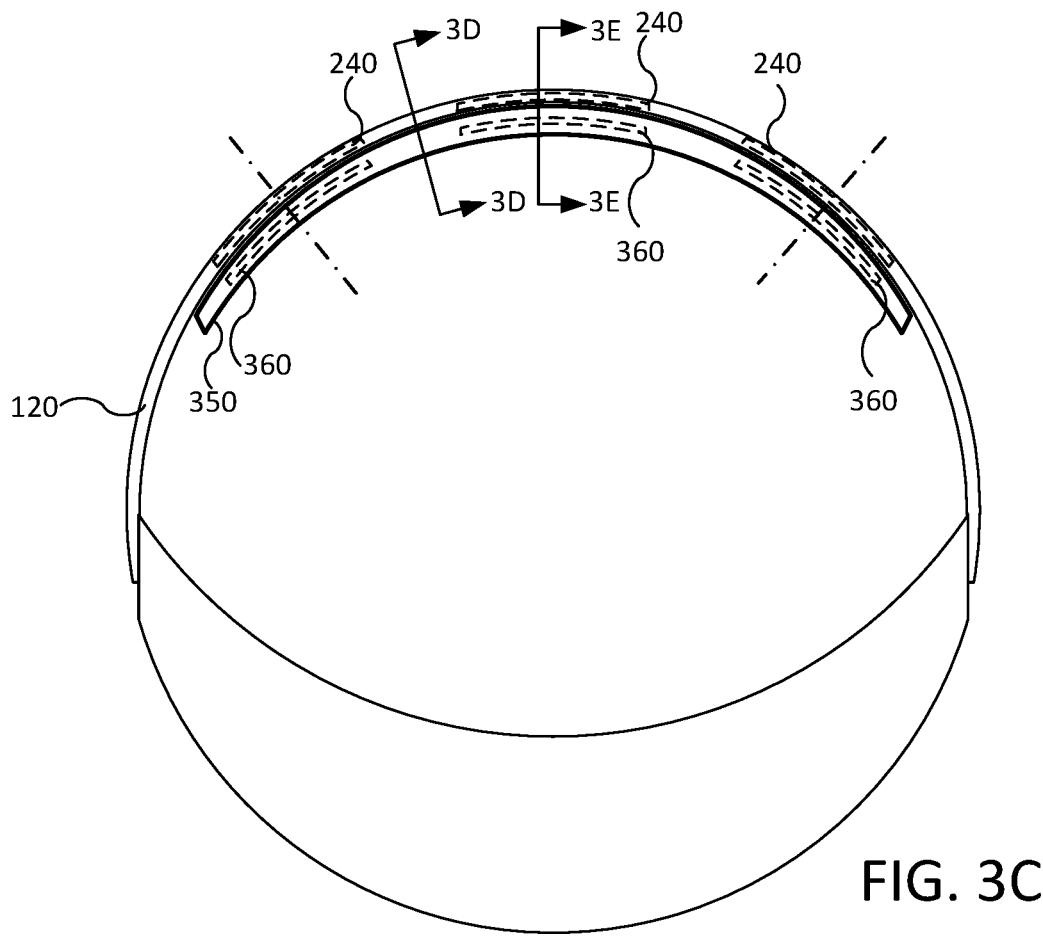
FIG. 3C is a top view of the head-mounted display of FIG. 1A with the power supply device of FIG. 3A coupled thereto.

As referenced above, the body 352 is flexible to allow the body 352 to conform to the shape of the head support 120 of the head-mounted display 100 (as indicated by arrows in FIG. 3B). The body 352 may also hold the transmission coils 360 in fixed lateral positions relative to each other, which correspond to positions of the receiving coils 240 on the head support 120.

The body 352 may, for example, include a polymer sheet material (e.g., a flexible circuit board) to which are coupled the transmission coils 360. The body 352 may also include a housing or cover (e.g., polymer, rubber, fabric), which covers and/or contains from contaminants the transmission coils 360 and other electronics (e.g., printed circuits, wires, etc.) of the power supply device 350.

The transmission coils 360 may also be flexible to conform to the shape of the head support 120 and/or the receiving coils 240 of the head-mounted display 100 and/or curved (as shown), or may be rigid with the body 352 being flexible therebetween (e.g., being curved or planar depending on the corresponding receiving coils 240).

Figure 3D:
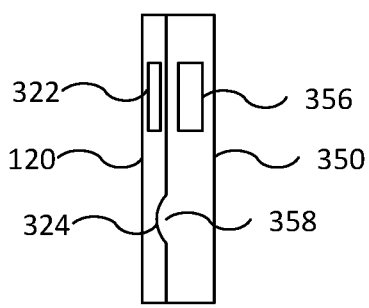
FIG. 3D is a cross-sectional view of the head-mounted display of FIG. 1A and the power supply device of FIG. 3A taken along line 3D-3D in FIG. 3C.
Figure 3E:
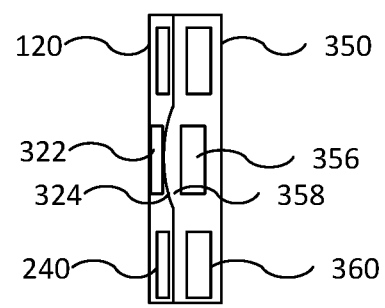
FIG. 3E is a cross-sectional view of the head-mounted display of FIG. 1A and the power supply device of FIG. 3A taken along line 3E-3E in FIG. 3C.
Figure 4A:
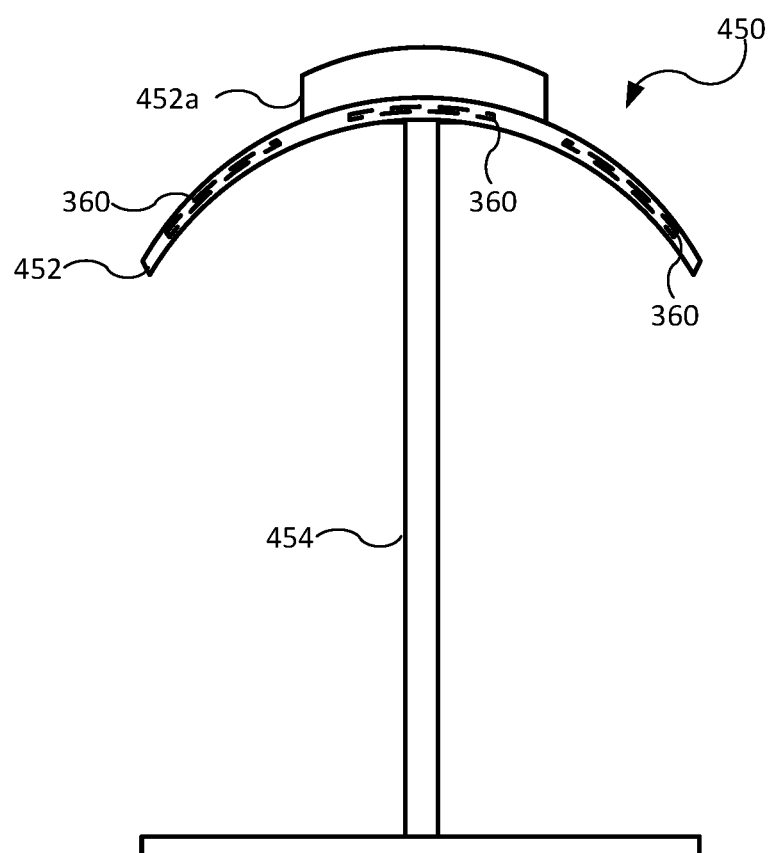
FIG. 4A is a front view of another power supply device with select hidden components shown in dashed lines.
Figure 4B:
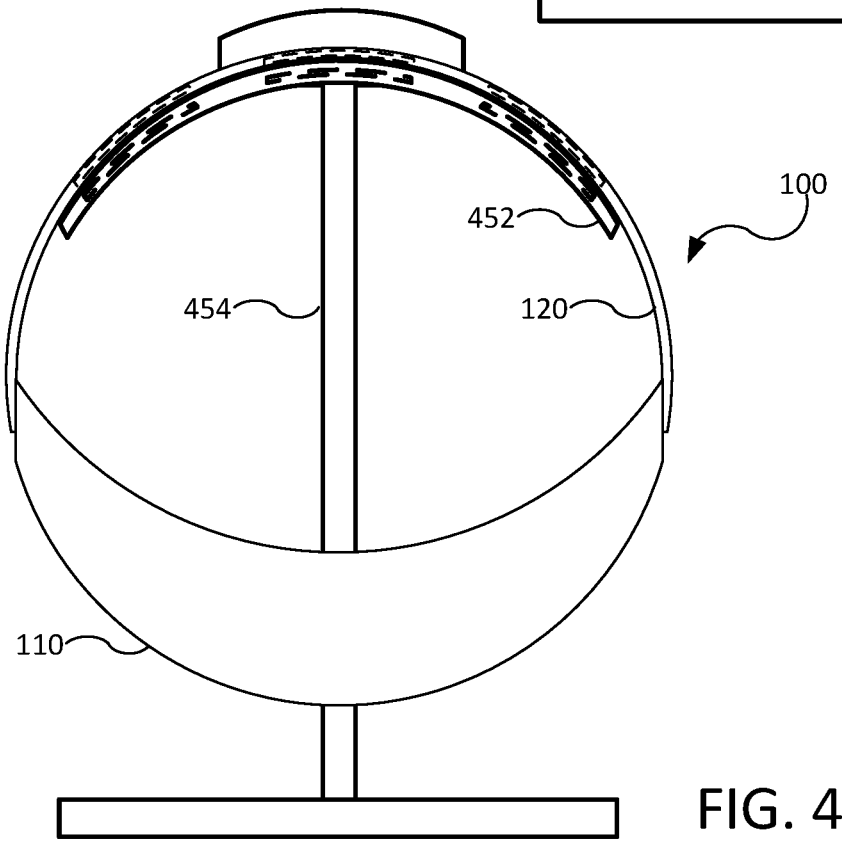
FIG. 4B is a front view of the power supply device of FIG. 4A with the head-mounted display of FIG. 1A supported thereon.
Figure 4C:
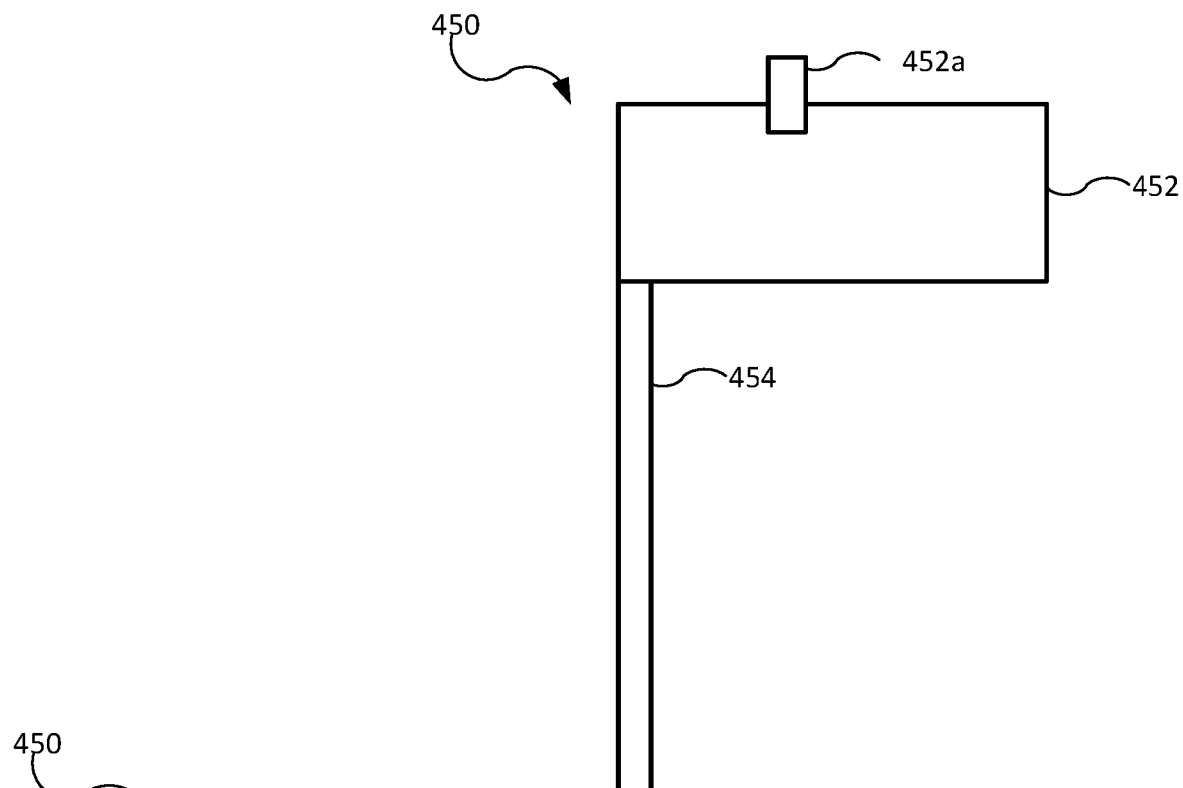
FIG. 4C is a side view of the power supply device of FIG. 4A.
Figure 4D:
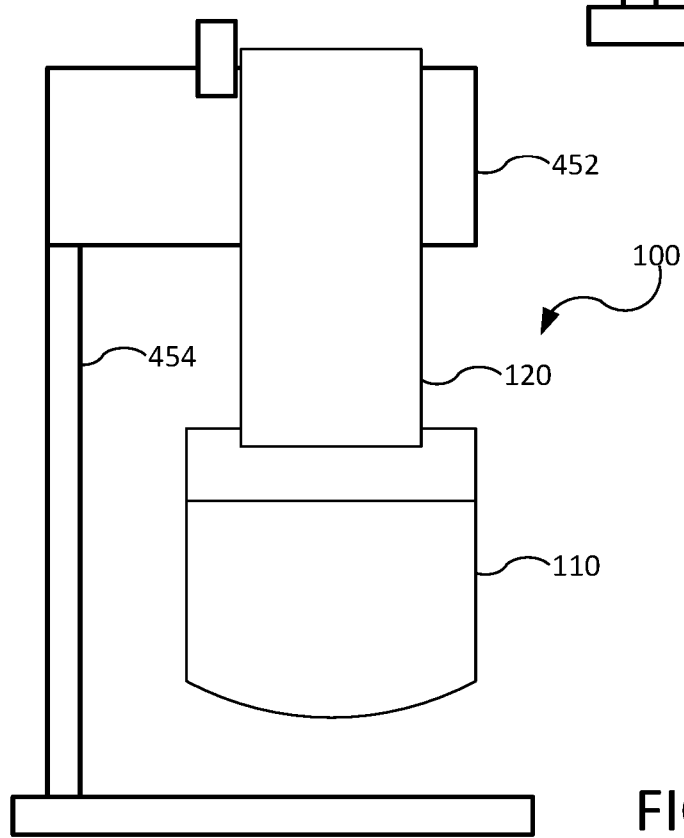
FIG. 4D is a side view of the power supply device of FIG. 4A with the head-mounted display of FIG. 1A supported thereon.
Figure 5A:
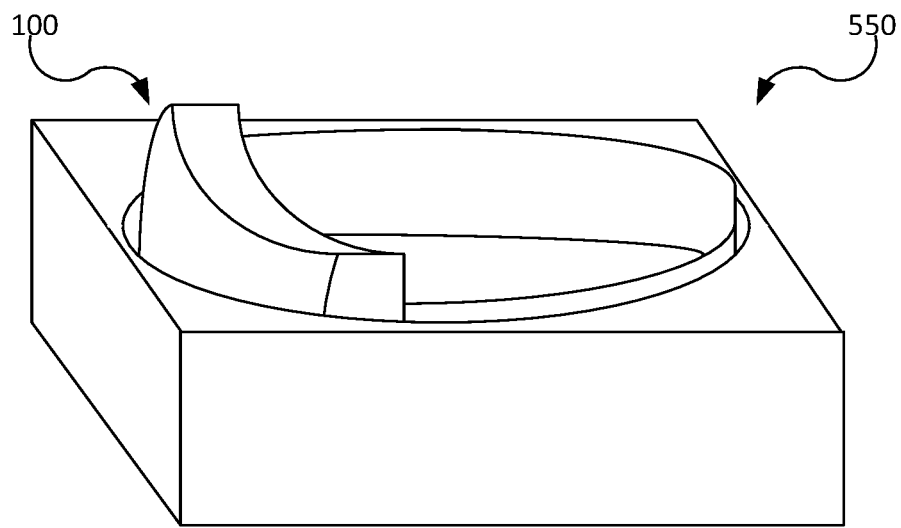
FIG. 5A is a perspective view of the head-mounted display of FIG. 1A and another power supply device.
Figure 5B:
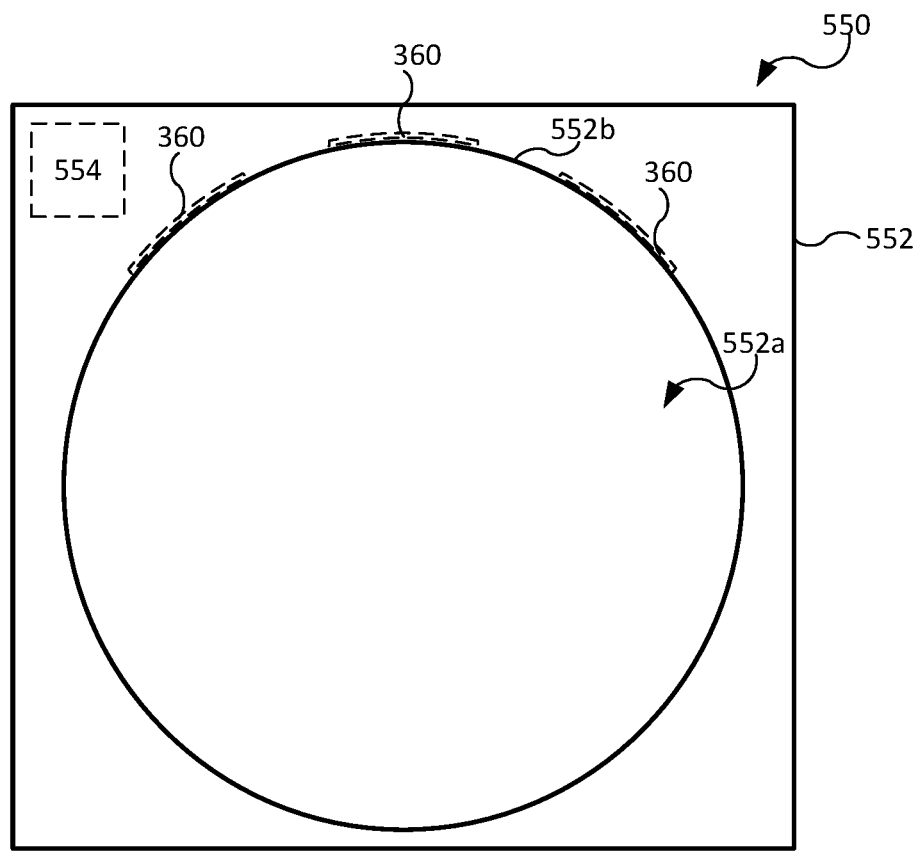
FIG. 5B is a top view of the power supply device of FIG. 5A with select hidden components depicted in dashed lines.
Figure 5C:
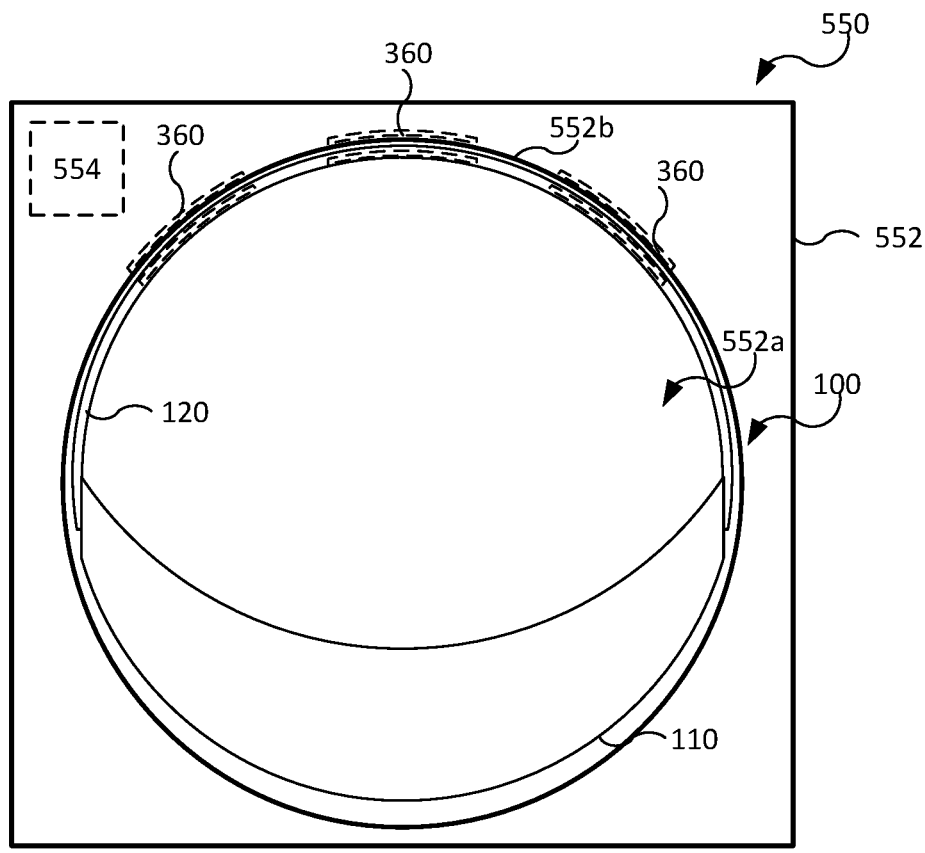
FIG. 5C is a top view of the head-mounted display of FIG. 1A in the power supply device of FIG. 5A.
Figure 5D:
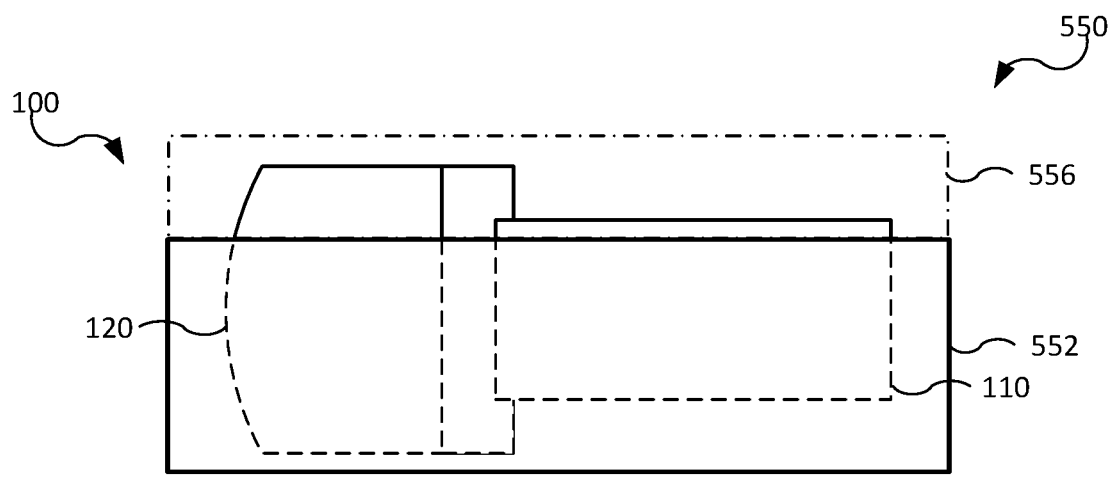
FIG. 5D is a side view of the head-mounted display of FIG. 1A in the power supply device of FIG. 5A with select hidden components depicted in dashed lines and a lid of the power supply device depicted in dash-dot lines.
Figure 6A:
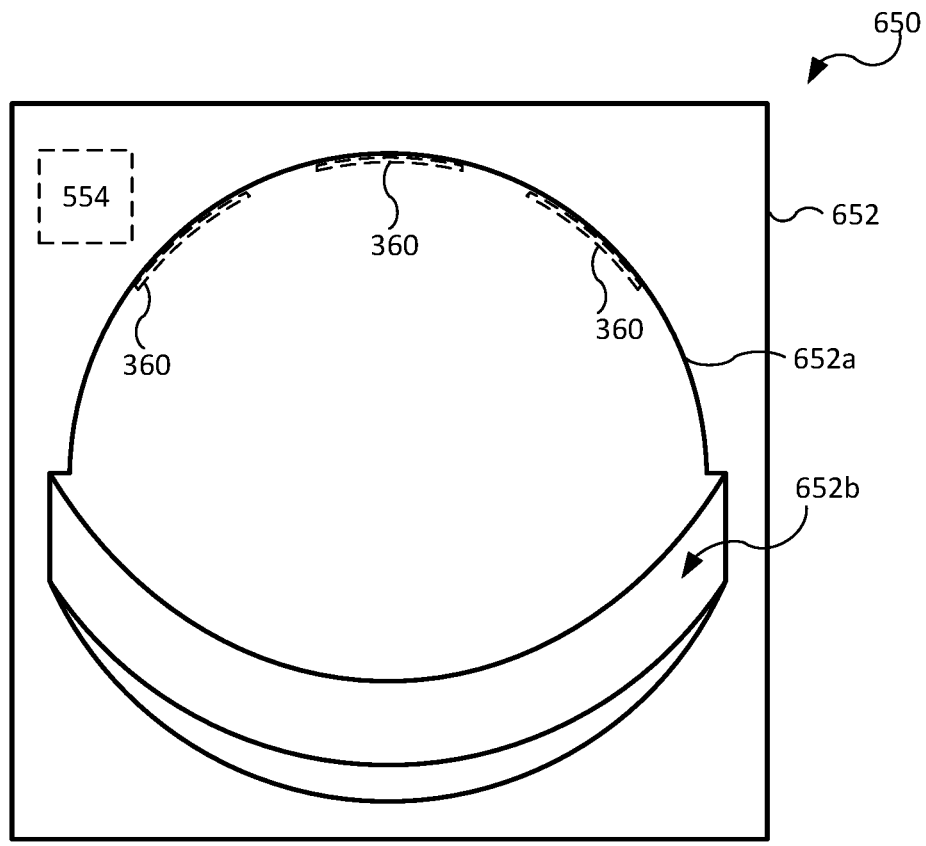
FIG. 6A is a top view of another power supply device with select hidden components depicted in dashed lines.
Figure 6B:
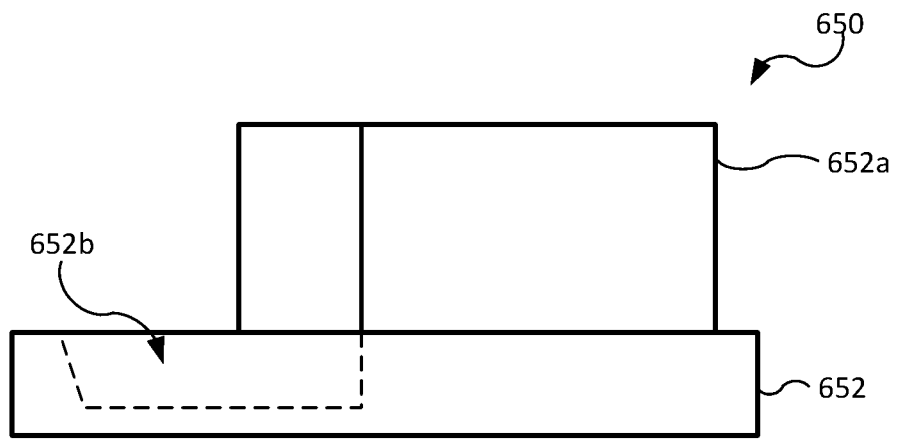
FIG. 6B is a side view of the power supply device of FIG. 6A with select hidden features depicted in dashed lines.
Figure 6C:
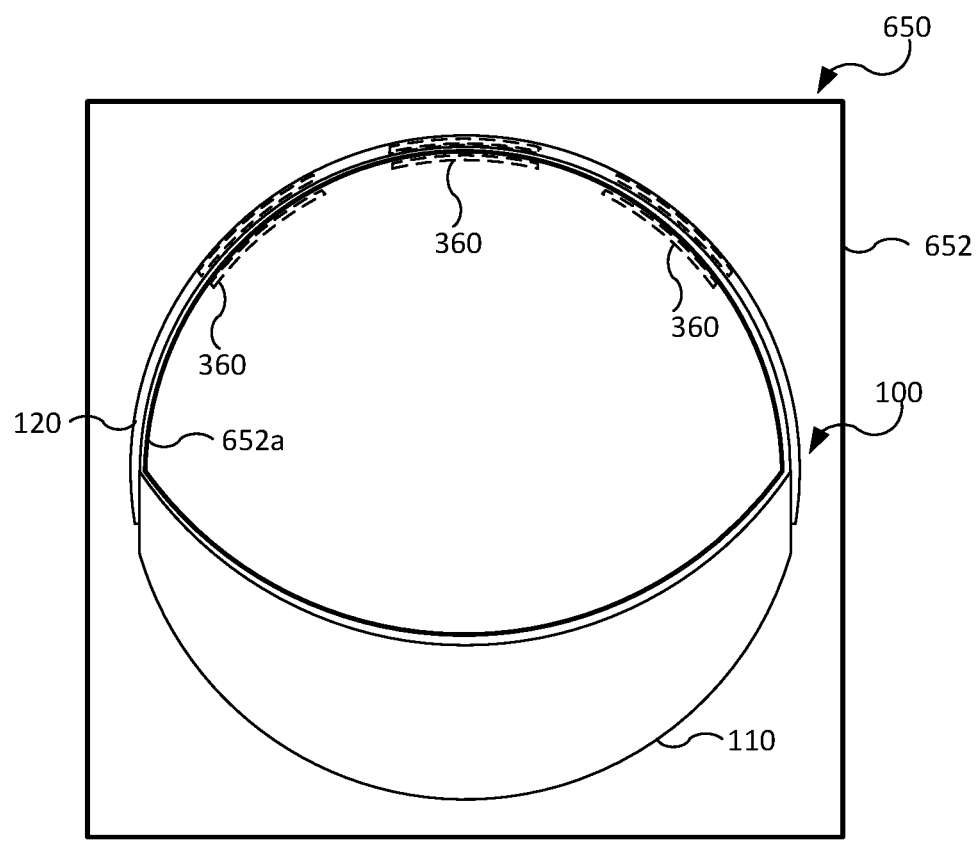
FIG. 6C is a top view the head-mounted display of FIG. 1A on the power supply device of FIG. 6A with select hidden components depicted in dashed lines.
Figure 6D:
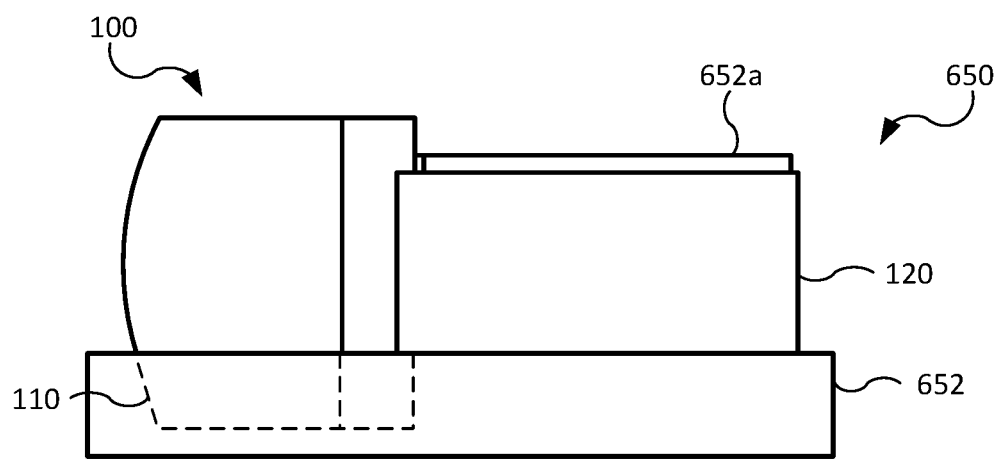
FIG. 6D is a side view the head-mounted display of FIG. 1A on the power supply device of FIG. 6A with select hidden features depicted in dashed lines.
Figure 7A:
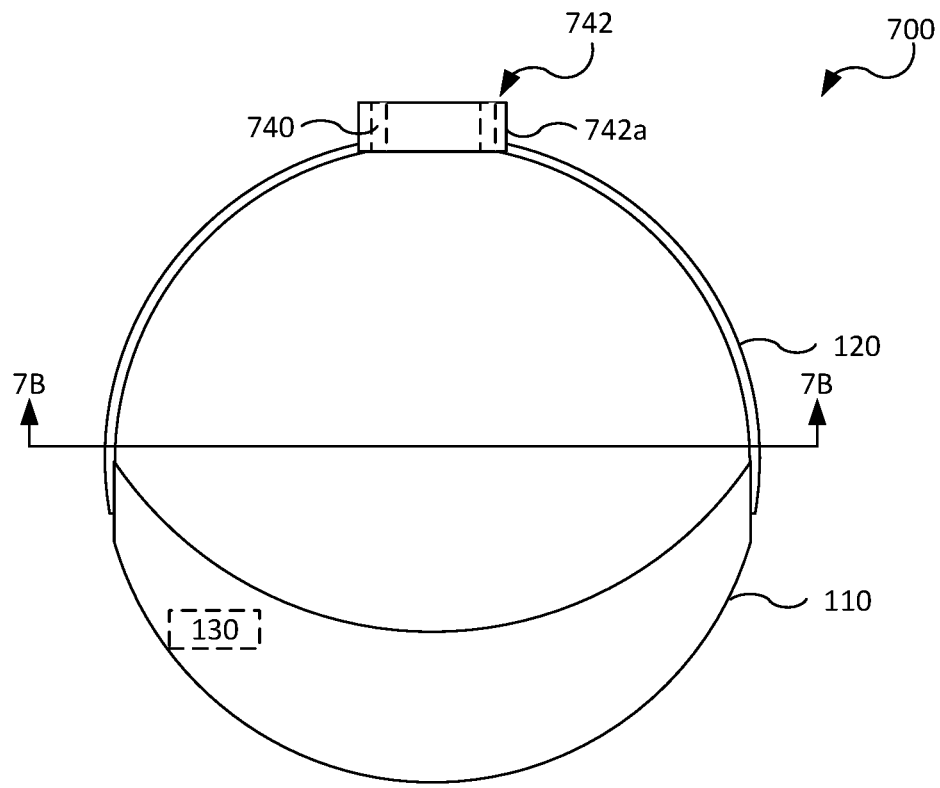
FIG. 7A is a top view of another head-mounted display.
Figure 7B:
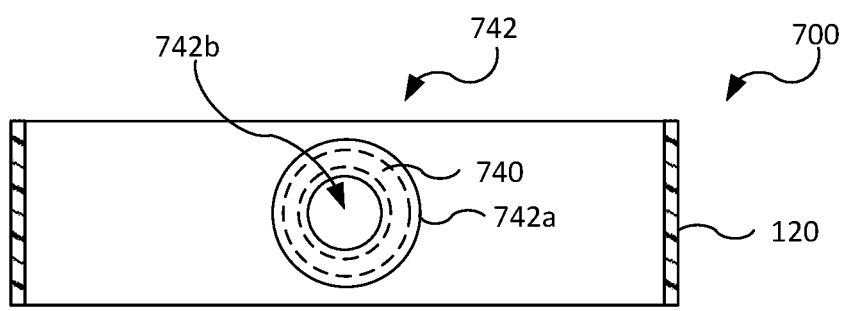
FIG. 7B is a cross-sectional view of the head-mounted display of FIG. 7A taken along line 7B-7B in FIG. 7A.
Figure 7D:
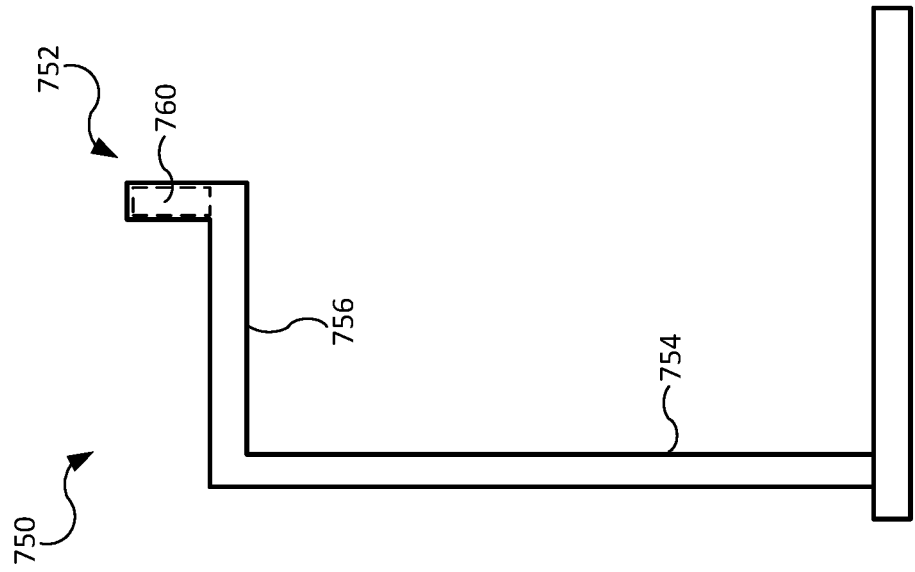
FIG. 7D is a side view of the power supply device of FIG. 7C.
Figure 7C:
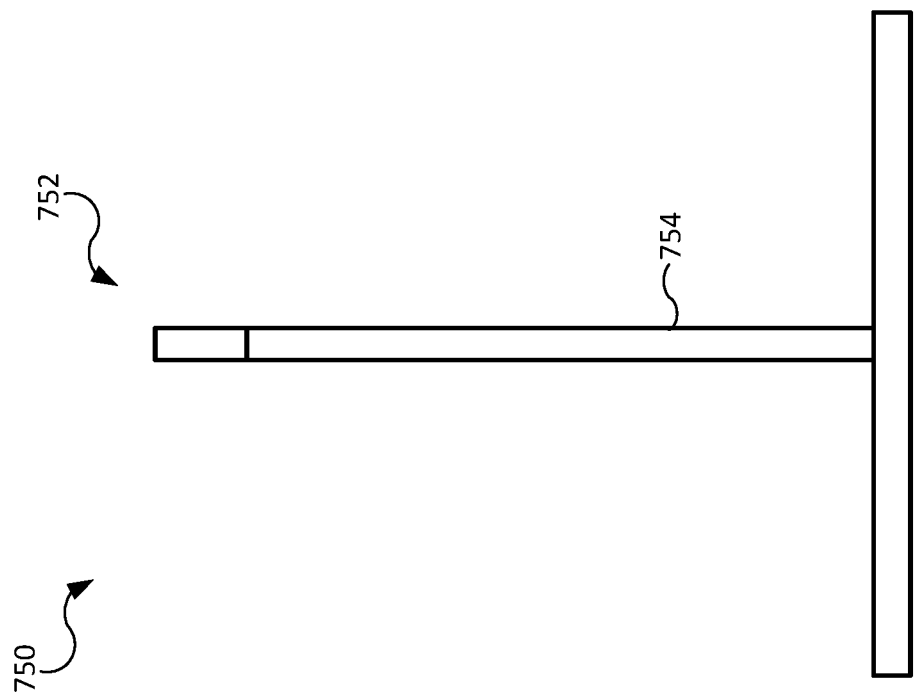
FIG. 7C is a front view of another power supply device.

The body 352 is configured to couple to the head support 120, so as to hold the transmission coils 360 in suitable alignment with and proximity to the receiving coils 240. For example, as shown in FIGS. 3D and 3E, the power supply device 350 and the head support 120 include corresponding magnetic coupling features 356, 322, respectively, which attract each other with magnetic force (e.g., magnets and corresponding attractor plates). The magnetic coupling features 356, 322 are suitable to hold the body 352 adjacent to the head support 120 and, thereby, the transmission coils 360 in suitable proximity to the receiving coils 240 for inductive power transfer (e.g., along the axes of the induction coils 240, 360). The magnetic coupling features 356, 322 may additionally function to align the transmission coils 360 with the receiving coils 240 for inductive charging (e.g., using magnetic force to draw the induction coils 240, 360 into alignment). The magnetic coupling features 356, 322 may, accordingly, be referred to as alignment features. As shown in FIG. 3D, the magnetic coupling features 356 of the power supply device 350 may be positioned between and beyond the induction coils 240, 360 (e.g., four locations for the three sets of induction coils 240, 360). Instead or additionally, the magnetic coupling features 322, 356 may be co-located with the induction coils 240, 360 (e.g., being positioned radially inward of the induction coils 240, 360).

Other alignment features, such as mechanical alignment features 358, 324 of the power supply device 350 and the head support 120, respectively, may be used in conjunction with the magnetic coupling features 356, 322 to ensure proper alignment (e.g., laterally) between the body 352 and the head support 120 and, thereby, between the transmission coils 360 and the receiving coils 240 for inductive charging. For example, as shown in FIGS. 3D and 3E, the mechanical alignment features 324, 358 may be configured as a recess and a protrusion, respectively, that mechanically interface to prevent movement lateral movement between the head support 120 and the body 352 of the power supply device 350 and may also function to guide power supply device 350 into proper alignment with the head support 120 (e.g., having tapered or rounded surfaces, as shown). As shown in FIG. 3D, the magnetic coupling features 356, 322 and/or the mechanical alignment features 358, 324 may be positioned adjacent and/or between the induction coils 240, 360 (e.g., four locations for three sets of the induction coils 240, 360). Instead or additionally, as shown in FIG. 3E, the mechanical alignment features 358, 324 may be co-located with the induction coils 240, 360 (e.g., be centrally located thereto within the induction coils 240, 360, such as coaxial therewith).

As an alternative to the magnetic coupling features 356, 322 and/or the mechanical alignment features 358, 324, the power supply device 350 may instead mechanically couple to the head support 120 of the head-mounted display 100 in other manners, for example, with male-to-female couplings (e.g., posts of the power supply device 350 extending through apertures of the head support 120; spring clips, clasps, or latches, among others).

Furthermore, while the power supply device 350 is shown coupled to an inner surface of the head support 120, the power supply device 350 may instead be coupleable to an outer surface of the head support 120, or may be interchangeably coupleable to each of the inner surface and the outer surface of the head support 120.

Referring to FIG. 4A-4D, a power supply device 450 includes a rigid structure that engages the head support 120 of the head-mounted display 100. For example, the power supply device 450 is configured as a stand that supports the head-mounted display 100.

The power supply device 450 generally includes a rigid support 452 and a base 454, as well as a power cord or other power source (not shown), such as the power cord 354 described previously. The base 454 is configured to stably rest on a flat surface (e.g., a desk, a table, or a shelf) and extends upward therefrom. The rigid support 452 protrudes forward from the base 454, so as to extend through the center of the head-mounted display 100 to engage thereabove an interior surface of the head support 120 and support the head-mounted display 100 above the flat surface. Alternatively, the rigid support 452 may be configured as a hook, which is coupleable to another object (e.g., a wall or furniture) for supporting the head-mounted display 100.

The rigid support 452 includes the transmission coils 360. The rigid support 452, for example, includes a housing that contains the transmission coils 360 therein and which engages the inner surface of the head support 120 of the head-mounted display 100. The transmission coils 360 are coupled to the rigid support 452 at positions corresponding to the positions of the receiving coils 240 on the head support 120 (e.g., having equal spacing therebetween). As a result, when the head support 120 of the head-mounted display 100 rests on the rigid support 452 of the power supply device 450, the transmission coils 360 are aligned with the receiving coils 240 corresponding thereto.

As referenced above, the rigid support 452 is rigid, so as to generally not bend or flex when the head-mounted display 100 is placed thereon. The head support 120 may, in some manners, conform to a shape of the upper surface of the rigid support 452. The housing or upper surface of the rigid support 452, for example, be formed of a polymer material (e.g., plastic) or other material (e.g., glass) that allows transmission of the electromagnetic field to pass therethrough from the transmission coils 360 to the receiving coils 240 of the head-mounted display 100.

The transmission coils 360 may be shaped to mirror the shape of the receiving coils 240 corresponding thereto, may be curved (as shown), or may be straight (e.g., planar).

The rigid support 452 and the head support 120 are cooperatively configured to align and hold in close proximity the transmission coils 360 and the receiving coils 240 to facilitate inductive power transfer therebetween. For example, the rigid support 452 and the head support 120 may include the magnetic coupling features 356, 322 and/or the mechanical alignment features 358, 324 described previously (e.g., positioned between or co-located with the induction coils 360, 240, respectively). Instead or additionally, the upper surface of the rigid support 452 and the inner surface of the head support 120 cooperatively form a low friction interface. As a result, the magnetic coupling features 356, 322, the mechanical alignment features 358, 324, and/or gravity (e.g., causing the display unit 110 to rotate to a bottom position) may cause the head-mounted display 100 to slide easily left-to-right to properly align the induction coils 360, 240.

Instead or additionally, the rigid support 452 may include one or more guides 452a (e.g., protrusions or recessed surfaces) that extend upward in front of and/or behind the head support 120 (e.g., behind as shown) to hinder front-to-back movement of the head support 120.

Weight of the head-mounted display 100 (e.g., of the display unit 110, the power storage device 130, and/or any additional components) may pull the receiving coils 240 downward into close proximity to the transmission coils 360.

Referring to FIGS. 5A-5D, a power supply device 550 is configured as a storage container (e.g., a case or a box) in which the head-mounted display 100 may contained.

The power supply device 550 generally includes a base 552 that defines a receptacle 552a therein for receipt of the head-mounted display 100 therein. The power supply device 550 may additionally include a lid 556 (shown in dash-dot lines in FIG. 5D) that is configured to close the receptacle 552a with the head-mounted display 100 therein. The power supply device 550 further includes one or more power sources, which may include the power cord 354 described above and/or a power storage device 554 (e.g., a battery) for charging the power storage device 130 of the head-mounted display 100.

The receptacle is defined by an inner wall 552b, which is complementary to the outer surface of the head support 120. The transmission coils 360 are incorporated into the base 552 in fixed spatial relationship to each other (e.g., being coupled to the inner wall 552b) corresponding to the lateral configuration of the receiving coils 240 of the head support 120 corresponding thereto.

The power supply device 550 and the head-mounted display 100 are cooperatively configured to align the receiving coils 240 of the head support 120 with the transmission coils 360 of the power supply device 550. For example, the base 552 (e.g., behind the inner wall 552b) and the head support 120 may include the magnetic coupling features 356, 322 and/or the mechanical alignment features 358, 324 described previously (e.g., positioned between or co-located with the induction coils 360, 240, respectively).

Instead or additionally, the power supply device 550 may include one or more protrusions within the receptacle 552a, which functions as a guide that biases and/or holds the head support 120 and, thereby, the receiving coils 240 into proper distance from and alignment with the transmission coils 360. Such a protrusion may, for example, be configured as a head support receptor 652a described in further detail below and may or may not include transmission coils 360 to be positioned proximate an interior of the head support 120. The head support 120 is then positioned between the back wall 552b of the receptacle 552a and the head support receptor 652a described below.

The receptacle 552a may further define a secondary recess (not labeled), which is complementary to and receives the display unit 110 therein, so as to properly align head support 120.

Referring to FIGS. 6A-6D, a power supply device 650 is configured as a platform or mat on which the head-mounted display 100 may be placed.

The power supply device 650 generally includes a base 652 that is complementary to and receives various lower portions of the head-mounted display 100. For example, the base 652 may include a head support receptor 652a and a display receptor 652b. The head support receptor 652a is configured as a protrusion that extends upward from surrounding portions of the base 652 to the head support 120 of the head-mounted display 100 thereover. The transmission coils 360 are coupled to the head support receptor 652a for alignment with the receiving coils 240 corresponding thereto. For example, the transmission coils 360 may be in a fixed spatial arrangement mirroring the lateral configuration of the receiving coils 240. The length of the head support 120 may hold the receiving coils 240 in close proximity to the transmission coils 360 and/or the head support 120 may be in tension (e.g., if elastic, as described above) against the head support receptor 652a.

The display receptor 652b is, for example, configured as a receptacle that receives a lower portion of the display unit 110 of the head-mounted display 100. The display receptor 652b may be shaped so as to receive the display unit 110 in one position, which may also orient the head support 120 relative to the display receptor 652b for alignment of the induction coils 240, 360.

The power supply device 650 and the head-mounted display 100 may be configured in other and/or additional manners to align the receiving coils 240 of the head support 120 with the transmission coils 360 of the power supply device 650. For example, the head support receptor 652a and the head support 120 may include the magnetic coupling features 356, 322 and/or the mechanical alignment features 358, 324 described previously (e.g., positioned between or co-located with the induction coils 360, 240, respectively).

The power supply device 650 further includes one or more power sources, which may include the power cord 354 described above and/or a power storage device 554 (e.g., a battery) for charging the power storage device 130 of the head-mounted display 100.

Referring still to FIGS. 7A-7G, a head-mounted display 700 is a variation of the head-mounted display 100, which includes a receiving coil 740 that is configured to receive a transmission coil 760 of a power supply device 750 therethrough. Thus, as opposed to the induction coils 240, 360 being arranged generally parallel with each other for charging, the induction coils 740, 760 are instead arranged coincident with each other in a female-to-male relationship (e.g., being concentric with each other). Power transfer between the induction coils 740, 760 occurs in the same manner as for the induction coils 240, 360 by the transmission coil 760 outputting an electromagnetic field that passes through and is converted into electrical power by the receiving coils 240. The coincident relationship between the induction coils 740, 760 may, however, transfer more power than the induction coils 240, 360 of comparable area, such that the number of the induction coils 740, 760 may be reduced and still achieve comparable power transfer.

The head-mounted display 700 is configured as the head-mounted display 100 described previously, but rather than include the receiving coils 240, instead includes the receiving coil 740. The receiving coil 740 is part of a receiver 742 that is coupled to the head support 120, for example, at a position generally opposite the display unit 110. The receiver 742 is configured to mate with the power supply device 750 to support the head-mounted display 700 thereby. The receiver 742 includes a housing 742a that encloses the receiving coil 740 and defines an aperture 742b therethrough.

The power supply device 750 is configured to be inserted into the aperture 742b of the receiver 742 and, thereby, support and position the head-mounted display 700 relative thereto. The power supply device 750, as shown, includes a protrusion 752. The protrusion 752 includes a housing 752a in which is positioned the transmission coil 760. The protrusion 752 interfaces with the receiver 742, so as to support the head-mounted display 700 and align the transmission coil 760 within the receiving coil 740 for charging the head-mounted display 700. While only one of the receivers 742 is shown, the power supply device 750 may include additional receivers 742 and the power supply device 750 additional protrusions 752 containing the transmission coils 760.

As shown, the power supply device 750 is configured as a stand. The power supply device generally includes the protrusion 752 and a base 754, as well as a power cord or other power source (not shown), such as the power cord 354 described previously and/or the power storage device 554. The base 754 is configured to stably rest on a flat surface (e.g., a desk, a table, floor or a shelf) and extends upward therefrom. An arm 756 extends forward from the base 754, while the protrusion 752 extends upward from the arm 756 to be inserted into the aperture 742b of the receiver 742. The arm 756, or another portion of the protrusion 752 (e.g., a flange), may engage the receiver 742 and/or the head support 120 to support the head-mounted display 700 thereon. For example, the protrusion 752 may extend upward from a structure shaped as the rigid support 452, so as to engage and support the head support 120.

Figures 8, 9:
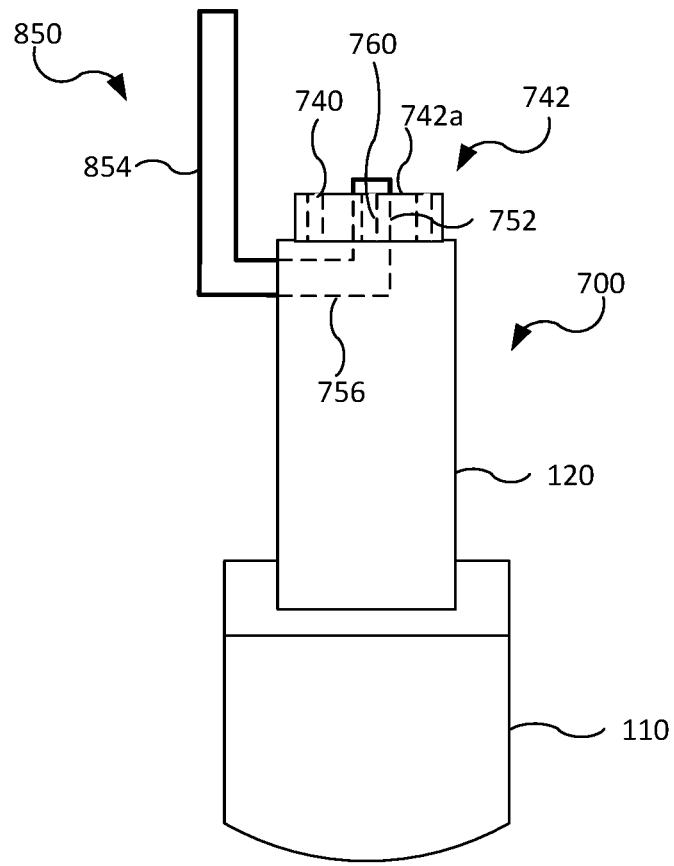
FIG. 8 is a side view of the head-mounted display of FIG. 7A on another power supply device.
FIG. 9 is a flowchart of a method for supplying power to a head-mounted display.

In another example, shown in FIG. 8, a power supply device 850 includes or is provided as a hook. The power supply device 850 includes the protrusion 752 described previously (e.g., having the housing 752a with the transmission coil 760 therein) and the arm 756. In one example, as shown, the power supply device 850 includes a shank 854 that extends upward from the arm 756 and is spaced apart from the protrusion 752 a sufficient distance (e.g., a gap) to receive a portion of the head support 120 and the receiver 742 therebetween. The shank 854 may be coupled to a wall, furniture, or other support structure.

Referring to FIG. 9, a method 900 is provided for supplying power to a head-mounted display, such as the head-mounted displays 100, 700. In a first operation 910, electrical power is supplied inductively from a power supply device (e.g., the power supply device 350, 850, or suitable variations thereof) to the head-mounted display at a first rate (e.g., a high rate) to charge a power storage device of the head-mounted display. During the first operation 910, the head-mounted display 100 may not be worn by a user and/or the display unit 110 may be operated in a low-power state (e.g., no power and/or no graphics displayed).

In a second operation 920, electrical power is supplied inductively from a power supply device, which may be the same power supply device used in the first operation 910, at a second rate (e.g., a low rate) sufficient to power a display unit (e.g., the display unit 110) of the head-mounted display 100. During the second operation, the head-mounted display 100 is worn by a user and/or the display unit 110 may be operated in a high-power state (e.g., displaying graphics to the user).

The second rate is lower than the first rate but sufficient to power the head-mounted display 100, including the display unit 110. The second rate may, for example, be less than 50% of the first rate, such as 25% or less of the first rate, or 10% or less of the first rate. Heat is generated by inefficiencies in inductive power transfer, thus by lowering the power transfer rate, less heat will be generated in the second mode than in the first mode. Thus, while worn by a user in the second mode with lower power transfer, less heat may be transferred during power transfer and the user may be more comfortable.

The lower power transfer rate of the second operation 920 may be achieved by one or more of (a) transferring power with fewer of the induction coils 240, 360, 740, 760 than in the first operation 910 (e.g., one set or two sets instead of three sets) or (b) transferring power at a lower rate through each of the induction coils 240, 360, 740, 760 than in the first operation 910 (e.g., at a lower rate through each of the same induction coils).

The method 900 may be implemented using a suitable computing device (e.g., having a processor, volatile memory, and non-volatile memory), which executes suitable instructions stored in software programming (e.g., code) associated with the first operation 910 and the second operation 920. The method may be further implemented with one or more sensors, which may, for example, detect when the head-mounted display is positioned on the head H of the user and/or when the display unit thereof is displaying graphic content.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources for content delivery and/or charging. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used for content delivery and/or charging. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of for content delivery and/or charging, the present technology can be configured to allow users to select to "opt in" or "opt out" of participation in the collection of personal information data. In another example, users can select not to provide personal information data for content delivery and/or charging. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users and/or charging be performed by inferring preferences based on non-personal information data or a bare minimum amount of personal information, such as the content being requested by the device associated with a user, other non-personal information available to the display system, or publicly available information.

What is claimed is:

1. A head-mounted display comprising:
a display unit;
a head support coupled to the display unit and configured to engage a head of a user for supporting the display unit thereon;
a power storage device for storing power to be supplied to the display unit; and
one or more receiving coils coupled to the head support and located rearward of the display unit for inductively charging the power storage device,
wherein the head support includes alignment features for aligning the one or more receiving coils with one or more transmission coils of a power supply device, each of the one or more receiving coils configured for inductive power transfer from a corresponding one of the one or more transmission coils when aligned.

2. The head-mounted display according to claim 1, wherein the head support is configured as a band and is flexible, and two or more of the receiving coils are coupled to and spaced apart along the band.

3. The head-mounted display according to claim 1, comprising two or more of the receiving coils spaced apart along the head support.

4. The head-mounted display according to claim 3, wherein the head support is flexible, and axes of the two or more receiving coils are movable relative to each other.

5. The head-mounted display according to claim 4, wherein the two or more receiving coils are fixed laterally relative to each other.

6. The head-mounted display according to claim 1, wherein the alignment features are magnetic coupling features.

7. The head-mounted display according to claim 6, wherein the alignment features further include mechanical alignment features.

8. The head-mounted display according to claim 1, comprising two or more of the receiving coils, wherein the head support is a band that is adjustable in length and the two or more receiving coils are spaced apart a fixed distance along the band.

9. The head-mounted display according to claim 1, wherein the head support includes a receiver having a housing containing the one or more receiving coils, the receiver defining an aperture for receiving a protrusion having a transmission coil of a power supply device.

10. A display system comprising:
a head-mounted display including:
a display unit,
a head support coupled to the display unit for engaging and extending along one or both of a left side or a right side of a head of a user to support the display unit thereon,
a power storage device coupled to the display unit for supplying power to the display unit, and
a receiving coil coupled to and co-located with the head support for inductively charging the power storage device; and
a power supply device including:
a base;
a transmission coil coupled to the base; and
a power source coupled to the transmission coil;
wherein the head-mounted display and the power supply device are cooperatively configured to align the transmission coil with the receiving coil for the transmission coil to produce an electromagnetic field that passes through the receiving coil for charging the power storage device.

11. The display system according to claim 10, wherein the head support is a band that is flexible and adjustable in length, and the head-mounted display includes two or more of the receiving coils spaced apart along the band.

12. The display system according to claim 10, wherein the head-mounted display includes a receiver coupled to the head support, the receiver having a housing that contains the receiving coil and that defines an aperture surrounded by the receiving coil; and
wherein the power supply device includes a protrusion formed by a housing that contains the transmission coil, the protrusion being insertable into the aperture of the receiver for aligning the transmission coil with the receiving coil.

13. The display system according to claim 12, wherein the head-mounted display is configured to hang from the power supply device with the protrusion inserted into the aperture of the receiver.

14. The display system according to claim 10, wherein the head-mounted display includes two or more of the receiving coils, and the power supply device includes two or more of the transmission coils.

15. The display system according to claim 14, wherein the two or more transmission coils are in fixed positions relative to each other.

16. The display system according to claim 14, wherein the head support is a band, and the two or more receiving coils are spaced apart along the band.

17. The display system according to claim 16, wherein the band is adjustable in length, and the two or more receiving coils are coupled to the band in positions that are movable laterally relative to each other.

18. A method for supplying power to a head-mounted display with a power supply device, the method comprising:
in a first mode when the head-mounted display is not worn by a user, inductively supply power at a first rate from the power supply device to the head-mounted display to charge a power storage device of the head-mounted display; and
in a second mode when the head-mounted display is worn by a user, inductively supply the power at a second rate from the power supply device to the head-mounted display to power a display unit of the head-mounted display, the second rate being lower than the first rate.

19. The method according to claim 18, wherein the power is inductively transferred with a same number of induction coils of the head-mounted display and the power supply device in the first mode and in the second mode.

20. The head-mounted display according to claim 1, wherein the power storage device is coupled to the display unit.

* * * * *